Patented Jan. 17, 1928.

1,656,232

UNITED STATES PATENT OFFICE.

CONSTANT PEETERS, OF BRUGES, BELGIUM.

PROCESS OF STABILIZATION OF FERRUGINOUS WATER.

No Drawing. Application filed September 8, 1925, Serial No. 55,205, and in Belgium September 9, 1924.

The present invention relates to an improved process of stabilization of ferruginous water.

Various methods have been devised heretofore to prevent the separation of the iron in ferruginous water, in order that the latter may be debited with the clear aspect which it has on leaving the source.

One of the methods suggested consisted in filling the bottles in such a manner that the water was protected against the oxidizing action of the air, and it has also been proposed to fill the bottles completely, and to add to the water supplementary carbonic acid.

According to the present invention, the preservation of ferruginous water is obtained by a novel method of preventing the separation of the iron, which consists in the addition to the water of a substance which stabilizes the iron and any colloidal elements which may be present, and which secondarily prevents the oxidation of the iron, these results being attained without any special precautions or manipulations.

The substances added to the water according to the present invention comprise organic poly-hydroxy compounds or compounds of the CHO groups, or both, these compounds answering the double purpose referred to. The said compounds preferably consist of one or more of the following substances:

1. Glycerine or other poly-hydroxy compounds;
2. Sodium-potassic tartrate, simple tartrate, lactate, citrate or any other polyhydroxy salt, with exclusion of the acids as such;
3. Glucose, glyoxal, or any other alcoholic or acid aldehyde, the latter in the shape of a salt.

The compound is added to the water in the proportion of a fraction of a gram per litre of water, either directly or in a solution of 50 per cent at least. The said addition is effected at the source without any special manipulations or precautions, and the water may be bottled directly.

I claim:

The improved process of stabilization of ferruginous water, consisting in the addition to the water of an aliphatic compound selected from the group consisting of the polyhydroxy and aldehyde compounds, capable primarily of stabilizing iron and any colloidal elements and secondarily of preventing oxidation of the iron, substantially as described.

In testimony whereof I signed hereunto my name.

CONSTANT PEETERS.